(No Model.) 9 Sheets—Sheet 1.

D. JOY.
VALVE OPERATING DEVICE FOR ENGINES.

No. 490,599. Patented Jan. 24, 1893.

Witnesses
George Baumann
James Gracie

Inventor
David Joy
By his Attorneys
Howson and Howson

(No Model.) 9 Sheets—Sheet 2.

D. JOY.
VALVE OPERATING DEVICE FOR ENGINES.

No. 490,599. Patented Jan. 24, 1893.

Witnesses
George Baumann
James Gracie

Inventor
David Joy
By his Attorneys
Howson and Howson (No Model.) 9 Sheets—Sheet 3.
D. JOY.
VALVE OPERATING DEVICE FOR ENGINES.

No. 490,599. Patented Jan. 24, 1893.

Witnesses
George Baumann
James Graere

Inventor,
David Joy
By his Attorney,
Howson and Howson (No Model.)

D. JOY.
VALVE OPERATING DEVICE FOR ENGINES.

No. 490,599. Patented Jan. 24, 1893.

(No Model.) 9 Sheets—Sheet 6.
D. JOY.
VALVE OPERATING DEVICE FOR ENGINES.

No. 490,599. Patented Jan. 24, 1893.

Fig. 11.

Witnesses.
George Baumann
James Gracir

Inventor
David Joy.
By his Attorney.
Howson and Howson (No Model.) 9 Sheets—Sheet 8.
D. JOY.
VALVE OPERATING DEVICE FOR ENGINES.

No. 490,599. Patented Jan. 24, 1893.

UNITED STATES PATENT OFFICE.

DAVID JOY, OF LONDON, ENGLAND.

VALVE-OPERATING DEVICE FOR ENGINES.

SPECIFICATION forming part of Letters Patent No. 490,599, dated January 24, 1893.

Application filed February 10, 1892. Serial No. 420,964. (No model.)

*To all whom it may concern:*

Be it known that I, DAVID JOY, engineer, a subject of the Queen of Great Britain and Ireland, residing at 17 Victoria Street, in the city of Westminster, London, England, have invented certain Improvements in Valve-Operating Devices for Steam or other Motive-Power Engines, of which the following is a specification.

My invention has for its object the improvement, and simplification, of the valve operating devices of steam, and other motive power engines.

According to my invention I use an eccentric (or eccentrics) whose position on the shaft, can be altered by the pressure of a fluid, semi-fluid or plastic material, conveyed through or along the shaft, for moving the valve for either headway, or astern, the said eccentric, or eccentrics, being mounted on a square or flattened part, or parts, of the crank-shaft the flattened surfaces being preferably at, or about, right angles to the center line of the crank and the eccentric being mounted thereon by a slotted hole which will allow of its being moved laterally to either side of the center line of the crank. I set the center of the eccentric a little above or below the transverse center line of the crank-axle accordingly as I wish to use inside, or outside, lap for admission of the motive fluid, and in amount according to the amount of lap and lead I propose to employ. Thus when the eccentric is set at its extreme to the one side of the center line of the crank (say at an angle of sixty degrees from it) it will be in position to move the valve for full throw for forward going, and if placed at an equal distance on the other side it will be in position to move the valve for back going and any position intermediate between these points will give the movement required for various degrees of expansion while the central position will be mid-gear. In order to move the eccentric by the pressure of fluid, semi-fluid or plastic material as described I may employ any suitable device for example I form a cylinder at each side of the eccentric with corresponding pistons attached to the shaft to push over the eccentric in either direction according to which cylinder motive fluid, or semi-fluid, or a plastic medium, is admitted which by its pressure will force the eccentric to either side and by its retention will also serve to hold the eccentric in any desired position. I may utilize the spaces between the squared part of the crank shaft and the sides of the slot in the eccentric as such cylinders by suitably closing them in. I may also employ a disk, or disks between two, or more, eccentrics such disk, or disks, carrying pins engaging in slides, or slots, in the eccentrics, such eccentrics being moved over by the fluid, or like, pressure, the disks and pins serving only to connect the motions of the eccentrics and to keep them in unison. I may employ a pump, or accumulator, or other source of pressure, to force the fluid, or the like, along pipes, or passages, and through holes in the crank shaft and cranks to the cylinders of the eccentrics. I prefer to run the engine in the direction in which the eccentric is always being driven by the crank shaft and not following it so that in case of failure of the reversing gear proper, pumps, pipes, or other parts, the eccentric will naturally fall into the position for full gear forward and there will thus be no break-down. If back gear be required it will only be necessary to move over the eccentric to the reverse position and the engine will be in condition to run backward.

In order that my invention may be clearly understood I will describe with reference to the accompanying drawings what I consider the best manner in which the same may be carried into practical effect.

Figures 1 to 8 illustrate typical forms. Figs. 4$^a$ and 4$^b$ are sections taken longitudinally through the shaft showing different arrangements; Figs. 9 and 10 are elevations at right angles to each other, showing the application of my invention to an engine; Fig. 9$^a$ is a sectional detail view.

Figure 1:
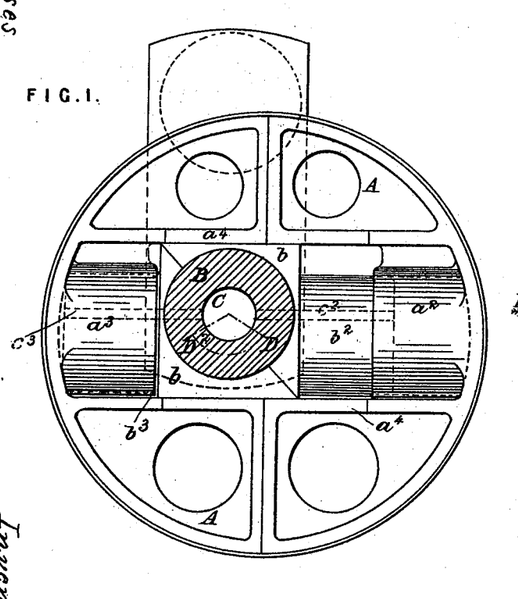
Figs. 1, 2 and 3 are respectively a side view of the eccentric mounted on the shaft; a view of the shaft at right angles to that of Fig. 1 and a view of one half of the eccentric at right angles to Fig. 1.
Figure 2:
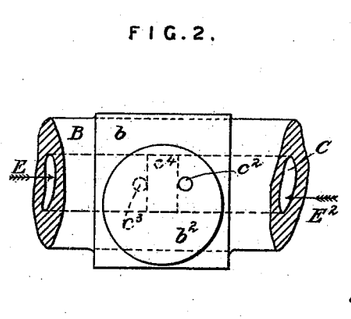
Figure 3:
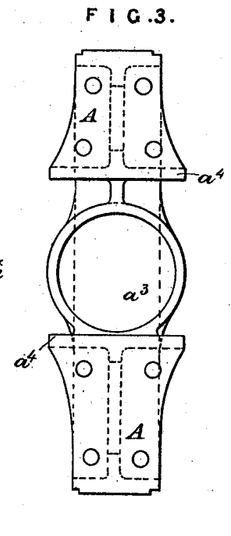

The crank shaft B is provided with a squared part at $b$ which may be either forged, or tooled, or be constructed by a casting mounted on the shaft, or in any other convenient way. On this squared part $b$ the eccentric A is mounted it being preferably formed in two parts as shown bolted together. It has a long slot in it so that its flanges $a^4$ can slide along the squared part $b$. On the squared part $b$ are formed two pistons or rams $b^2$ $b^3$ which work in corresponding cylinders $a^2$ $a^3$ formed on, or secured to, the eccentric A. The main crank shaft is made hollow (as is frequently the case in engines built for war ships) the hollow being shown at C, and communication between this space and the two cylinders $a^2$ $a^3$ is formed by the passages $c^2$ $c^3$ (passing through the shaft, the squared part $b$ and the pistons or rams $b^2$ and $b^3$) which passages are separated from each other by a plug $c^4$ forced tightly into the hollow space C in the shaft. Thus the eccentric A is free to move on the squared part $b$ till its center passes from D to $D^2$ it being set in the one extreme position correctly for forward going and in the other extreme position for backward going the intermediate positions being those for giving various points of "cut off" the center position between D and $D^2$ being "mid-gear."

When oil, or other fluid, or semi-fluid, or plastic material, is injected, by any suitable means, into one end of the crank shaft (say in the direction shown by the arrow E in Fig. 2) it passes through the channel $c^3$ and enters the cylinder $a^3$ so forcing the eccentric in the direction from D to $D^2$ and holding it in the position to which it has been brought. Of course on reversing the direction of the inlet of the fluid, or the like, as shown by the arrow at $E^2$ the position of the eccentric will be reversed. The position of the eccentric may be arrested, and held, so that its center is at any point between D and $D^2$ by checking the inlet of the motive fluid, or the like.

Figure 4:
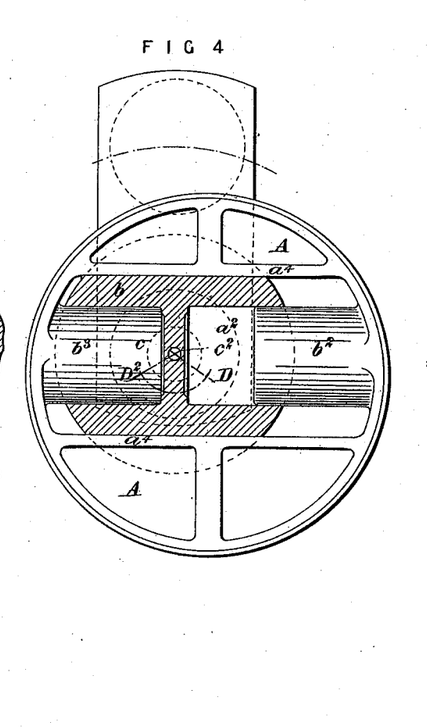
Fig. 4 is a view similar to Fig. 1, showing a modification.
Figure 5:
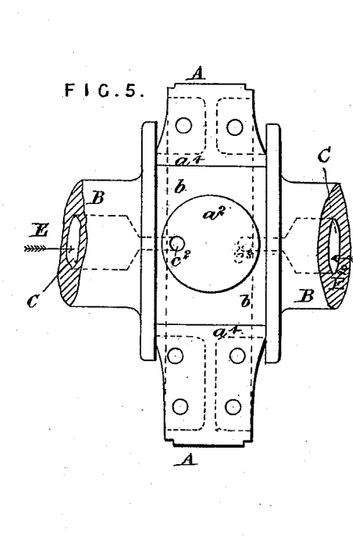
Fig. 5 is a view at right angles to Fig. 4.

Figs. 4 and 5 show in views at right angles to each other (one half the eccentric being removed in Fig. 5) a modification of the arrangement according to my invention wherein the positions of the cylinders and pistons are reversed the cylinders $a^2$ $a^3$ being formed in the body of the crank shaft which has a boss $b$ formed, or secured, on it for the purpose and the pistons, or rams, $b^2$ $b^3$ are formed on, or secured to, the eccentric. The sliding surfaces for the flanges $a^4$ of the eccentric are formed by flatting the boss $b$. The operation is the same as in the arrangement Figs. 1. 2 and 3 and will be readily traced as the same letters of reference are used to denote similar parts.

Figures 6, 6A:
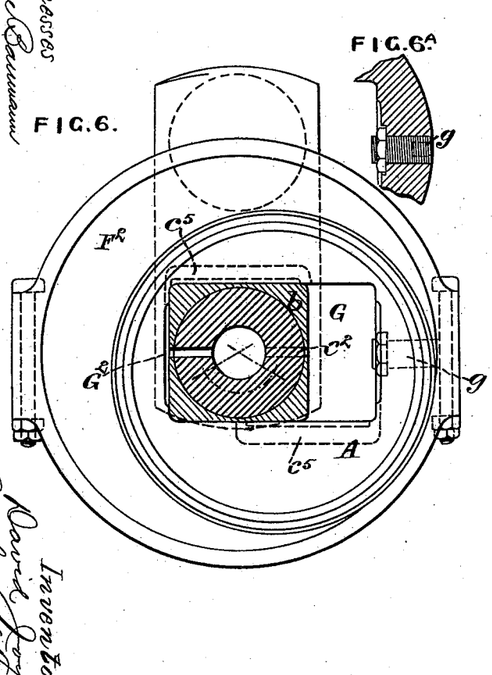
Figs. 6, 7 and 8 show further modifications similar to the preceding figures.
Figure 7:
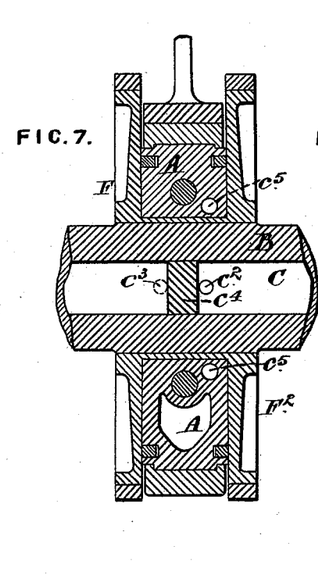
Figure 8:
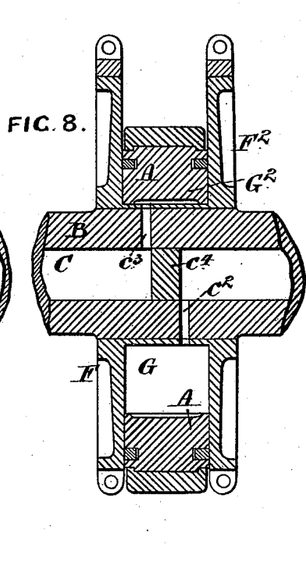

Figs. 6. 7 and 8 show a further modification according to my invention operating in substantially the same manner as do the preceding arrangements. Fig. 6 is a side view of the eccentric with one of the disks (F) removed and Figs. 7 and 8 are sections both being taken transversely to Fig. 6 but at right angles to each other. In this arrangement the shaft B is made square at the part where the eccentric is situated by mounting or forming on it the squared part $b$ on which, the eccentric A slides but, in this case, the eccentric is closed in by disks F $F^2$ one on each side and the closed in spaces so formed at G $G^2$ between the faces at the ends of the slot in the eccentric and the faces of the square $b$ on the shaft constitute the cylinders; the square on the shaft constituting in effect the piston. Here again the operation is the same as in the other examples and the parts not described here are marked with the same letters of reference and their functions will be well understood from the preceding description. In all the preceding arrangements if the shaft be not already made hollow then a small hole can be drilled up its center and through the crank pins and webs for the transmission of the operating fluid, or the like.

It will be understood that when two, or more, eccentrics are employed the channels to, and from, the cylinders will be made through the shaft so that the fluid, or the like, expelled from the cylinders of the first eccentric, or eccentrics, will pass to the cylinder of the next eccentric, or eccentrics, to move it, or them, also in the required direction.

To provide that on reversing all the eccentrics of an engine each eccentric shall be forced over to its full extent without regard to the position for cut off which it may have occupied there is a small channel $c^5$ (Figs. 6 and 7) connecting both ends of the spaces G and $G^2$ in such-wise that, when the first eccentric has been moved fully over by the main supply, if there has not been sufficient fluid, or the like, before it to move over the next following eccentric fully then this small channel $c^5$ passes over a sufficiency of fluid, or the like, from the main supply to complete the movement and the same action takes place with regard to the next eccentric if there be one. Thus it is provided that, whatever position any eccentric shall have occupied, each will on reversing be forced over into full gear.

In the examples Figs. 1 to 8 I have shown the pistons or rams and the spaces or cylinders to which the fluid, or semi-fluid, or plastic material, is applied as being formed within the eccentric but I do not limit myself to this as the said pistons, or rams, and the said spaces, or cylinders, in communication with the passages in the shaft, may be outside the eccentric, the one, or the other, being connected to the eccentric by a pin, or in any convenient way.

Figures 4A, 4B:
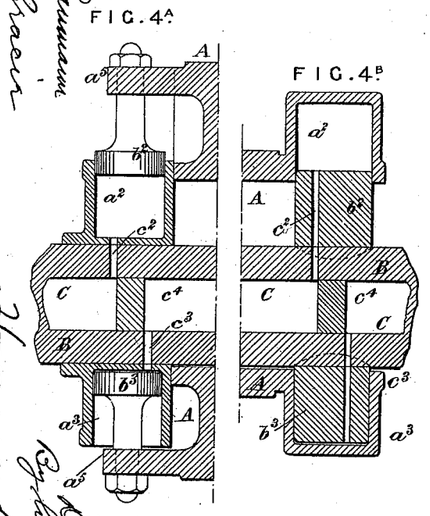

Fig. $4^a$ shows an arrangement wherein the cylinders $a^2$ $a^3$ are secured to the shaft and are in communication with the passage C therethrough by the passages $c^2$ and $c^3$. The pistons $b^2$ $b^3$ which move in the said cylinders are attached to the eccentric by the lugs $a^5$ so as to move it in either direction substantially as hereinbefore explained.

Fig. $4^b$ shows an arrangement wherein the pistons $b^2$ $b^3$ are mounted on the shaft B and have passages $c^2$ $c^3$ through them for the fluid or the like from the passage C in the shaft. The cylinders $a^2$ $a^3$ are cast with or connected to the eccentric and slide over the pistons $b^2$ $b^3$.

Figures 9, 9A:
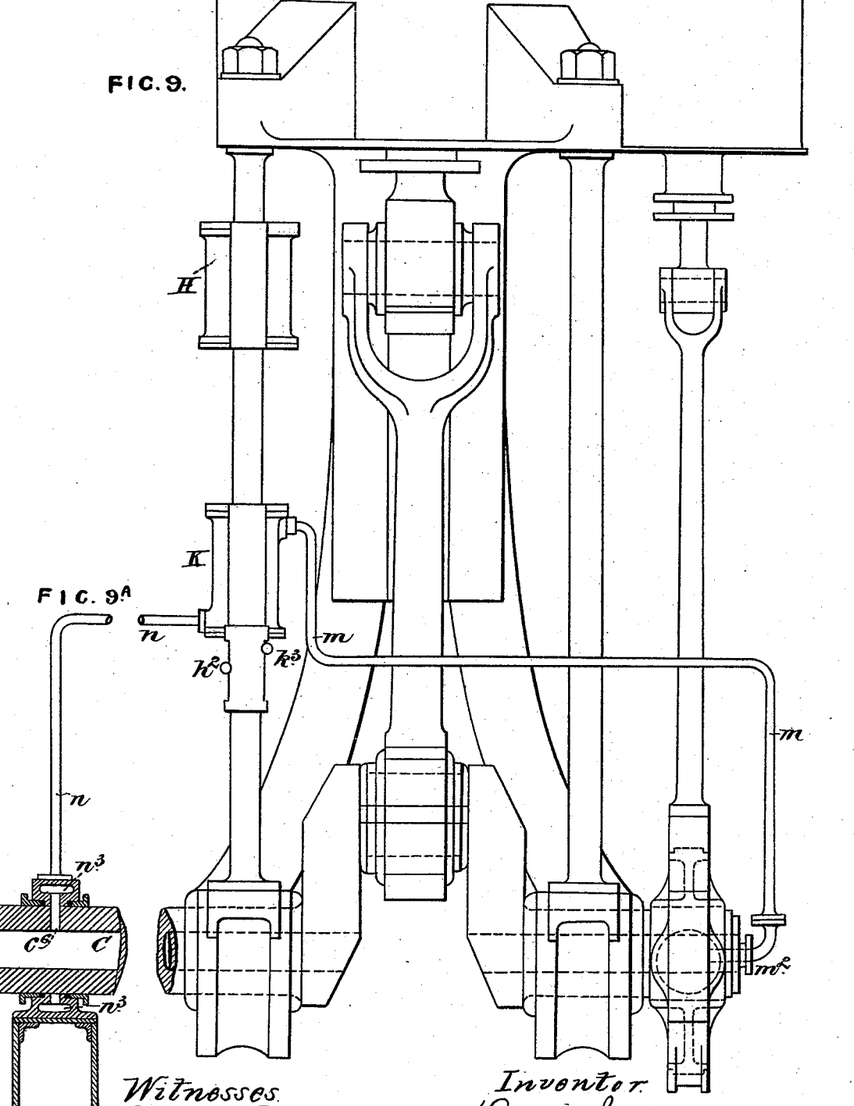
Figure 10:
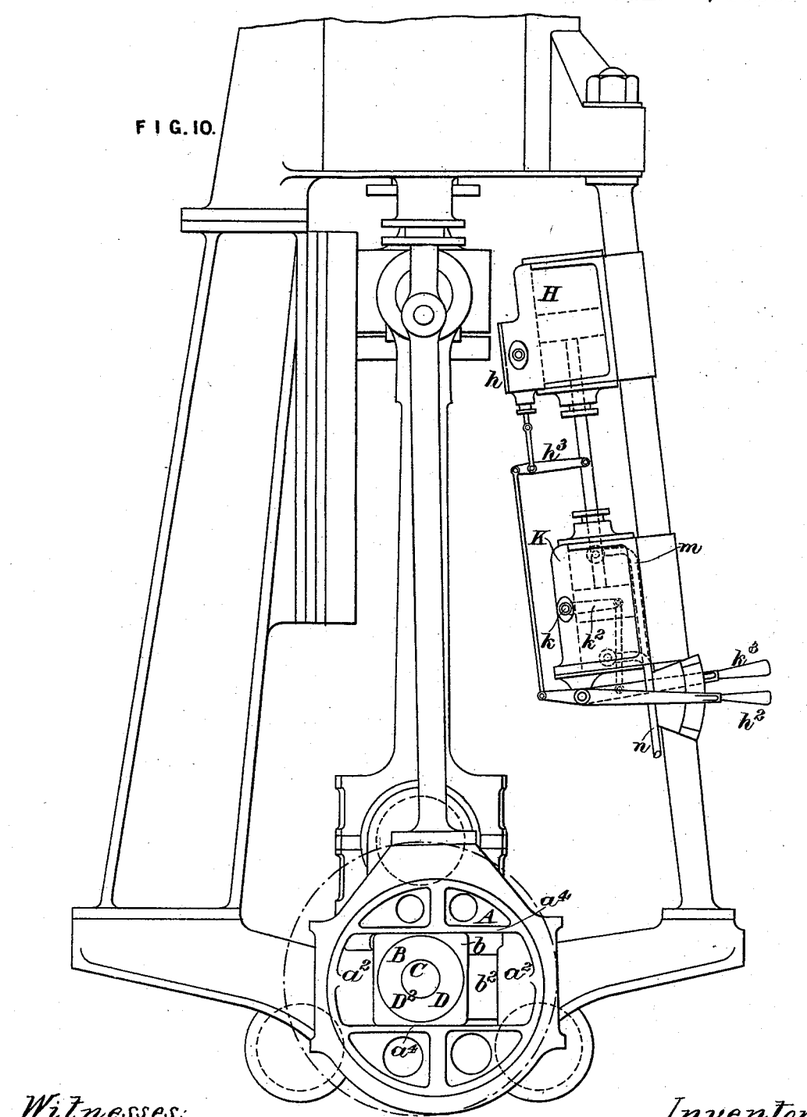

Figs. 9 and 10 are elevations at right angles to each other showing the application of my invention to an ordinary overhead triple marine engine the high pressure cylinder alone being shown however.

Fig. $9^a$ is a sectional view of a small part of the main shaft showing convenient means for passing the operating fluid, or the like, into, or out of, the hollow in the shaft at the after end. The construction here shown is the same as that shown in Figs. 1. 2 and 3 and the same parts are marked with the same letters as in the said figures but I have here shown means which may conveniently be used for injecting the operative fluid or the like. It consists of a steam cylinder H with a slide or piston valve $h$ which is moved by the hand lever $h^2$ and which may, or may not, be controlled by a hunting lever as at $h^3$ or by a false valve face. In line with this is placed the cylinder K for the fluid, or the like, used to actuate the eccentric (say oil) with its inlet for oil at the pipe $k$ this may be connected to an accumulator, or reservoir, of oil under pressure the object of it being to keep the oil cylinder K always full and the supply is controlled and its passage to the top, or bottom, of the cylinder regulated through the lever $k^2$ and hand lever $k^3$. The oil is conducted from the top or bottom of this cylinder, or returned to either, respectively by the pipes $m$ $m$, for the top of the cylinder and the forward end of the shaft and by the pipes $n$ $n$ for the bottom of the cylinder and the after end of the shaft. On steam being passed into the cylinder H to raise its piston, the piston of the oil cylinder K is also raised forcing the oil, in its upper part, along the pipe $m$ $m$ into the forward end of the crank shaft at $m^2$ through the hollow space C of which it will pass and through the channel $c^2$ into the cylinder $a^2$ carried in the eccentric (see also Figs. 1 and 2) which will be moved over so that its center is in the position D. Meanwhile the oil in cylinder $a^3$ has been caused to pass through the channel $c^3$ and the hollow C in the shaft to perform the like operations for the next following eccentric (if more than one be used in the engine as is presumed to be the case in the example illustrated) and so on till the moving body of oil is passed along to the channel C in the shaft out therefrom through the hole $c^6$ into the hollow collar $n^3$ and therefrom by the pipe $n$ back to the lower end of the oil cylinder K. In this position the eccentric, or eccentrics will stand for say forward going and by reversing the position of the piston in the steam cylinder H the whole of the positions will be reversed or, in passing from one position to the other, may be arrested and kept in any desired intermediate position. In this arrangement the passage of the operating fluid may be automatically regulated as hereinafter explained with reference to Figs. 11 to 15.

Figure 11:
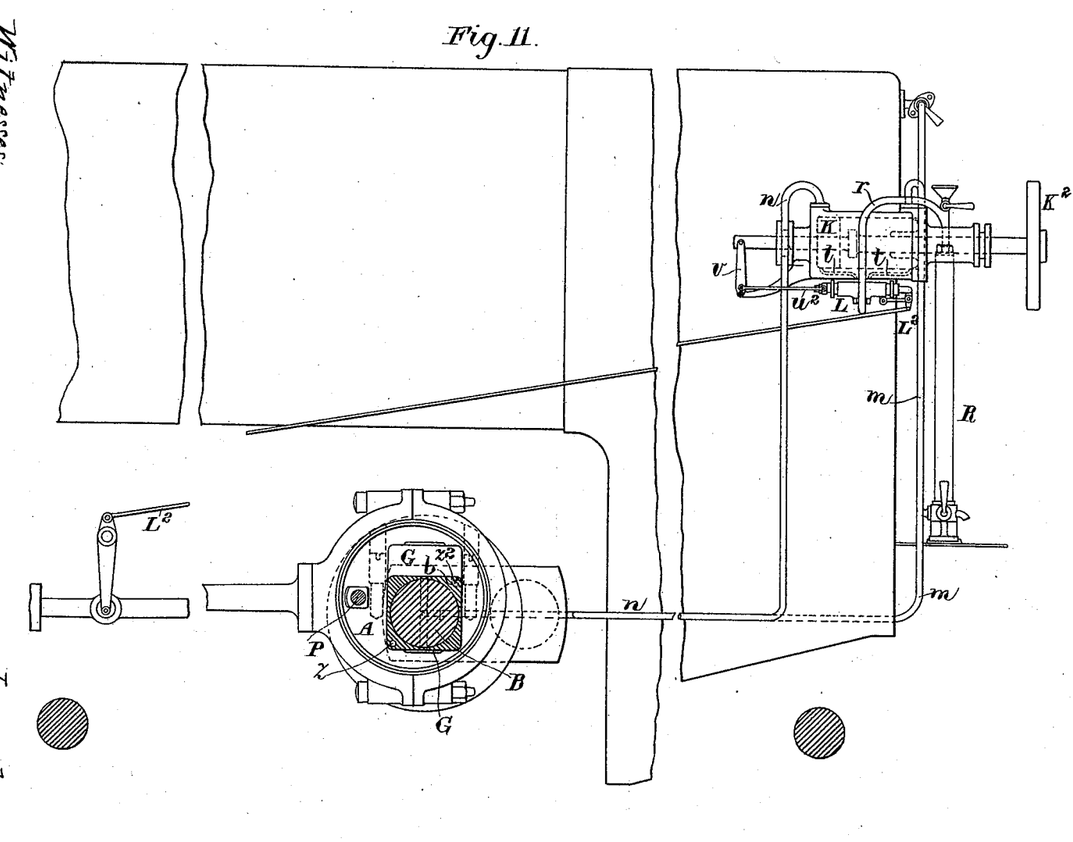
Figs. 11 and 12 illustrate another application of my invention.
Figure 12:
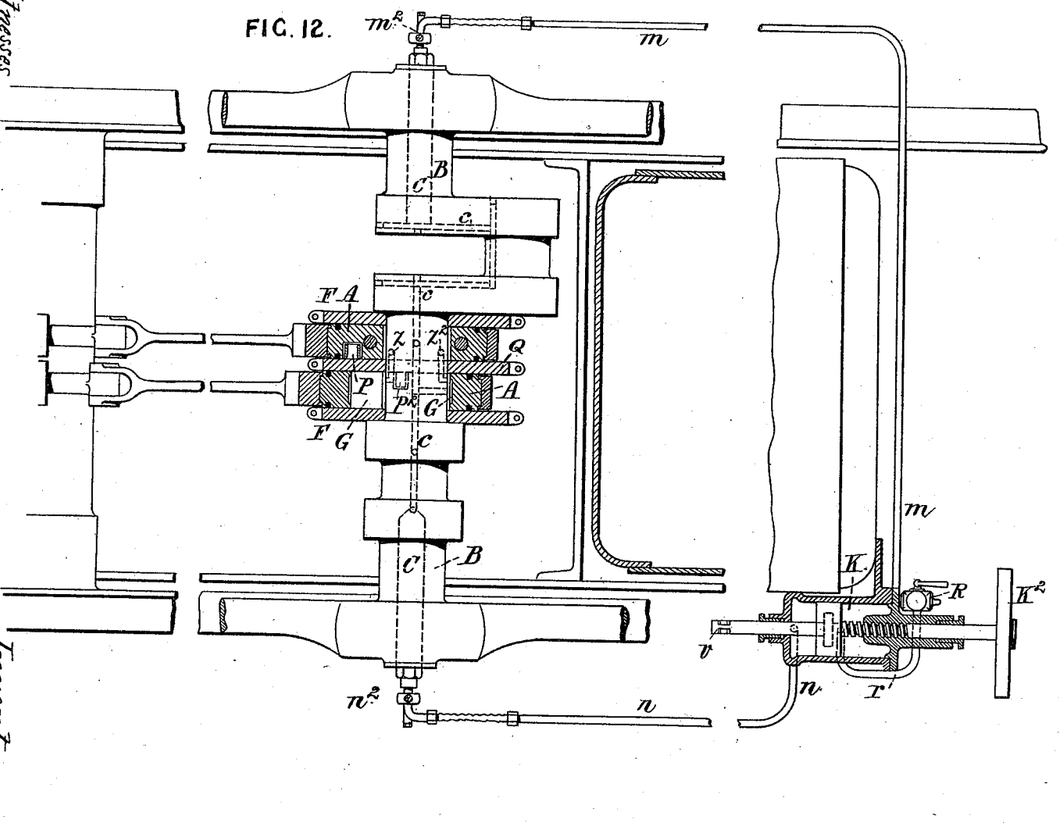

Figs. 11 and 12 illustrate the application of my invention to an ordinary inside cylinder locomotive engine, Fig. 11 being a partial longitudinal sectional elevation and Fig. 12 a partial sectional plan.

Figure 13:
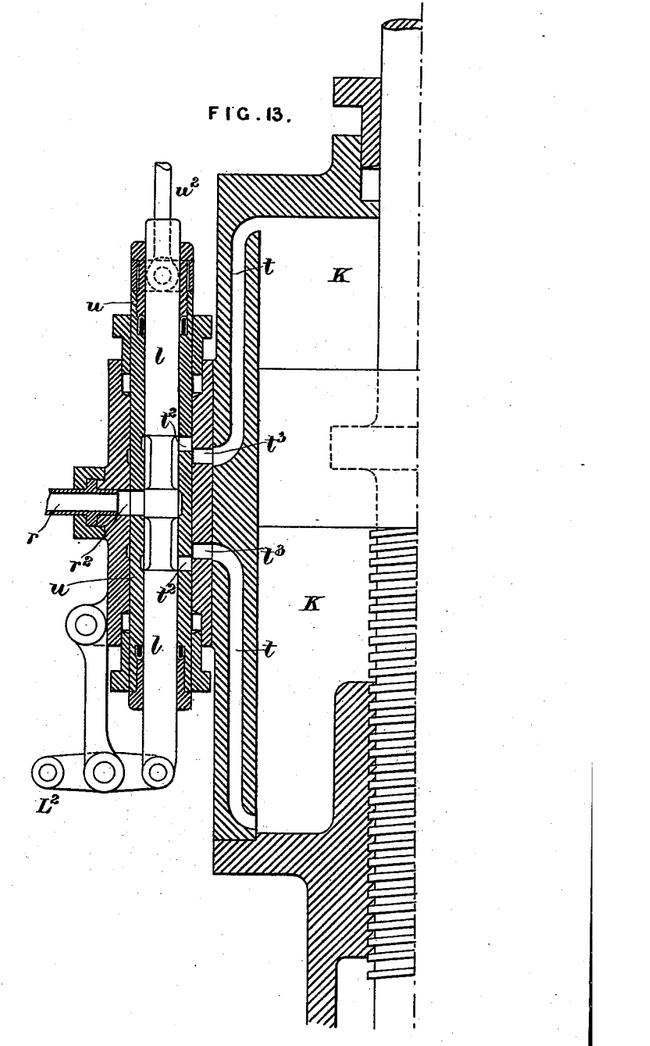
Figs. 13 and 14 are detail views.
Figure 14:
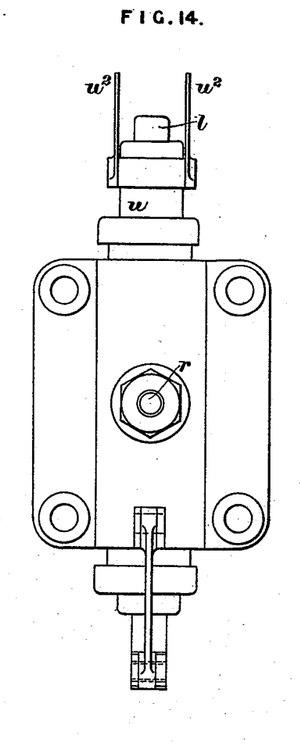

Figs. 13 and 14 are details as hereinafter described. The parts here shown which correspond to like parts in the previous figures are marked with the same letters of reference as those employed in the previous figures. The arrangement corresponds to that shown in Figs. 6. 7 and 8. The motive fluid in the cylinder K for the operating fluid or semi fluid (say oil) is set in motion by a screw on the piston rod actuated by a hand wheel $K^2$ (similar to the hand wheel frequently employed on locomotives for reversing) and the oil passes as in the former case along the pipes $m$ or $n$ to either end of the crank shaft B which is perforated at C and $c$ to carry the oil through to the chambers G G where it effects the movement of the eccentrics A in either direction as required. In this case the oil passes from one side of the engine directly into the chambers of both eccentrics acting simultaneously on both by passing from the one through to the other by the small channels $z$ $z^2$ formed in the corners of the square $b$. The two eccentrics are also coupled together by the pins P $P^2$ which are set fast at right angles in the central dividing ring Q which itself is free to revolve on a circular part at the center of the block $b$. These pins P $P^2$ engage respectively in sliding blocks in each eccentric so coupling and maintaining their positions always relatively at right angles.

In order to provide for any loss of the operative fluid which may take place by leakage or otherwise I provide what I call a recuperative valve shown in Figs. 13 and 14 and also in Fig. 11 at L. This valve is supplied with fluid under pressure which may be the boiler pressure from the small reservoir R and pipes $r$ and is connected to the two ends of the cylinder K by ports $t$ $t$. The valve proper $l$ is moved through a very short stroke by gear $L^2$ (see Fig. 11) connected with the valve spindle as shown and its motion always bears the same relation to the stroke of the valve, this motion causes it to traverse the port of admission $r^2$ from the pipe $r$ and this port is formed in an adjustable shell $u$ in which the valve $l$ moves and which contains also ports $t^2$ $t^2$ communicating with ports $t^3$ $t^3$ for passing the motive fluid to either end of the cylinder K. This valve shell $u$ is connected to the piston of the cylinder K by the rod $u^2$ and lever $v$ (see Fig. 11) so that the shell $u$ will follow the motions of the said piston in the cylinder K and the ports in the shell $u$ are so proportioned with reference to the movement of the valve $l$ that at whatever position the piston of the cylinder K is set (and therefore the eccentric on the block $b$) it follows that the effective stroke of the main valve will correspond with the positions of the piston in K and the eccentric A and so the point of cut-off will be maintained as any alteration in the length of the valve stroke caused by leakage, which must be in the direction of lengthening it (as the oil drives the valve), will lengthen also the stroke of the valve $l$ and admit oil to make up the loss and so bring back the length of stroke to the amount for which it is set.

Figure 15:
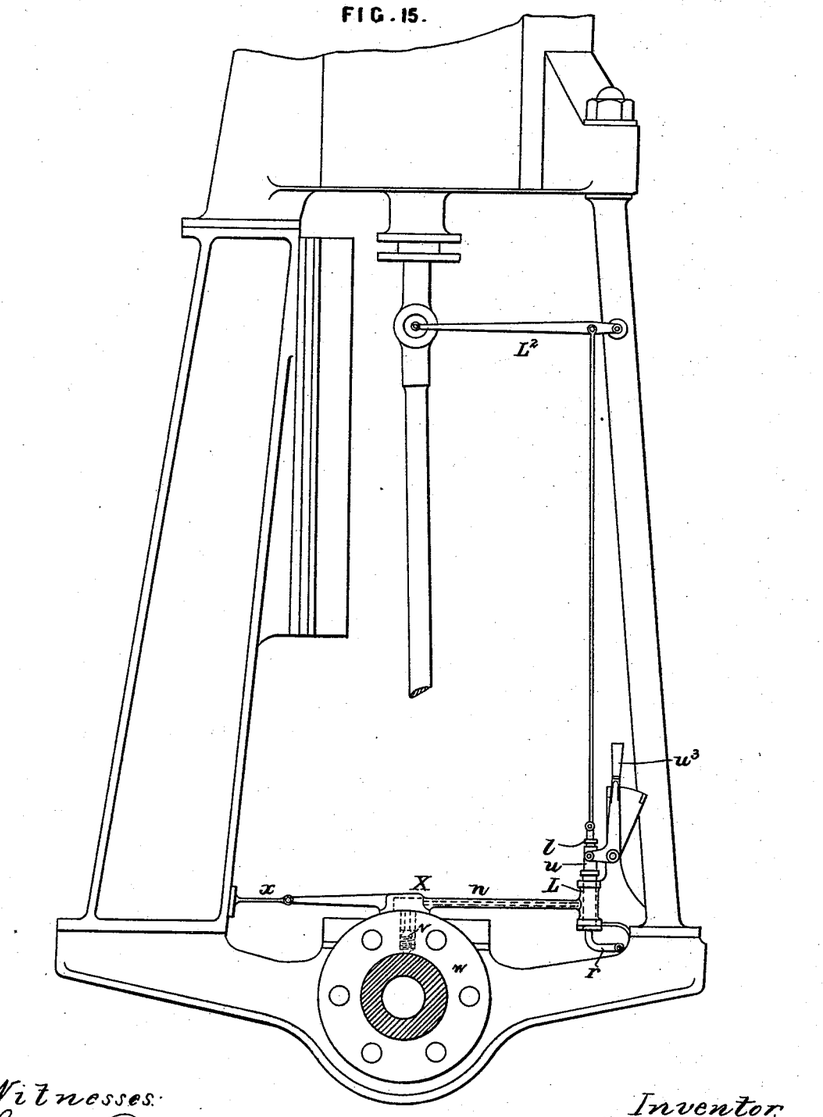

The recuperating cylinder Figs. 13 and 14 may be also applied to compound triple or multiple cylinder marine or other engines and in this position it will also serve the function of an adjusting valve by connecting it to the oil supply between any two cylinders which it is intended to recuperate or differentiate and so adjust the powers of the cylinders one against the other. In Fig. 15 is shown such application and here it is convenient to add a non-return valve $v$ connecting with the supply in the crank shaft and this may be passed through a cheese-head coupling $w$ or any other available part of the shaft. The cuperative valve chest is shown at L and its valve $l$ is worked through the valve gear $L^2$ as already described the inner adjusting shell $u$ being set by a special hand lever $u^3$. Thus the eccentric of each cylinder of a multiple engine may be separately adjusted and being so adjusted is maintained in its adjusted position by the lever arrangement $L^2$ and valve $l$. The oil is passed through the pipe $n$ and cap X which is held firmly in its position on the cheese-head $w$ by the spring $x$. It is preferable to set the non-return valve $v$ (or point of inlet) in such position in the revolution as to be opposite the opening in the cap X at the moment that the valve $l$ opens to pass oil. This valve is connected as hereinbefore described through the pipe $r$ to the special supply reservoir or this valve may be made to take the form of a small pump forcibly to inject oil. It will be evident that instead of performing the adjustment by forcing in oil it may be effected by withdrawing oil between any two of the cylinders. But if it is preferred to run an engine with a fixed and unaltered point of cut off in each cylinder and for simplicity to do without any of the adjusting or recuperating arrangements it is only necessary to insert in the driving end of the oil space of the eccentric say at G. Figs. 6 and 6ª a fine thread screw $g$ by which to adjust the fullest travel of the eccentric and the revolving motion of the engine together with the motive oil will then keep the eccentric steadily pressed up against this screw $g$.

I claim—

1. In valve operating devices for steam, or other motive power engines, the combination of the crank-shaft having passages therein, and an eccentric or eccentrics adjustably mounted thereon, with means for the admission of fluid, or semi-fluid, or plastic material through the passages in the shaft, to operate the eccentric or eccentrics, substantially as described.

2. In valve operating devices for steam, or other motive power engines, the combination of the crank-shaft, having passages therein and an eccentric or eccentrics adjustably mounted thereon, by means of cylinder and piston connection, with means for the admission of fluid, or semi-fluid, or plastic material through the passages in the shaft directly to the cylinders of the eccentric or eccentrics whereby the position of the eccentric or eccentrics relatively to the shaft is effected by direct pressure of the said fluid, or semi-fluid or plastic material, substantially as described.

3. The combination of a crank-shaft and eccentrics adjustably mounted thereon, with cylinders and pistons connecting the said shaft and the said eccentrics, and passages leading from the ends of the shaft to one cylinder of each end eccentric, and intermediate passages through the shaft connecting one cylinder of one eccentric to one cylinder of the next eccentric for the passage of fluid, substantially as and for the purpose set forth.

4. The combination of a crank-shaft, and an adjustable eccentric or eccentrics mounted thereon, with cylinders and pistons to control the relative positions of the said shaft and eccentric, passages through the shaft leading to the cylinders for the admission of fluid, and means for controlling the said fluid, all substantially as set forth.

5. The combination of a crank-shaft, an adjustable eccentric mounted thereon, with cylinders and pistons to control the relative positions of the said shaft and eccentric, passages leading to the cylinders, a fluid cylinder, from each end of which one of the said passages leads respectively, and a piston for, and a reservoir connected to the said fluid cylinder, all substantially as and for the purposes set forth.

6. The combination of a crank shaft, and an adjustable eccentric or eccentrics mounted thereon, and cylinders and pistons to control the relative positions of the said shaft and eccentric, with a fluid cylinder and piston therefor, a recuperative valve L, a fluid reservoir and passages leading from the fluid cylinder to the shaft, all substantially as and for the purposes set forth.

In testimony whereof I have signed my name to this specification in the presence of two subscribing witnesses.

DAVID JOY.

Witnesses:
 WM. JOHN WEEKS,
 PERCY R. SOLLERING,
*Both of 9 Birchin Lane, London, E. C.*